(12) United States Patent
Smith et al.

(10) Patent No.: US 8,341,091 B2
(45) Date of Patent: Dec. 25, 2012

(54) COMPUTER SYSTEM FOR MANAGING ORDERS FOR AND DELIVERIES OF GOODS

(75) Inventors: Bruce Smith, Huntington Beach, CA (US); Chuck Hamilton, Redondo Beach, CA (US); Stephen D. Osborne, Torrance, CA (US); Tony E. Gomes, Troy, OH (US); Kathy Howell, Springfield, OH (US); Steven M. Bailey, Springboro, OH (US); Anthony Rivalsky, Beavercreek, OH (US); Don Edwards, Fairfield Glade, TN (US); Eric Wehrley, Troy, OH (US); Al Ortlepp, Fountain Valley, CA (US); Nina Bryson, Torrance, CA (US); Mark Seraydarian, Torrance, CA (US); Sammy Tom, Arcadia, CA (US); Jim Dromey, Troy, OH (US); Karen Moore, Casstown, OH (US); Kathy Kamiya, Valencia, CA (US); Sandy Bustillos, San Pedro, CA (US); Sue Trainoff, Manhattan Beach, CA (US); Karen Patterson, San Pedro, CA (US); Yukio Sato, Torrance, CA (US); Renee Neighbours, Dana Point, CA (US); Suzanne Li, Rancho Palos Verdes, CA (US); Adrian Reilly, Redondo Beach, CA (US); Daniel Tan, Cerritos, CA (US); Ping Kao, Yorba Linda, CA (US); Cathy Brady, Seal Beach, CA (US); Grace Tachibana, Temple City, CA (US); Homs Lee, Glendora, CA (US); Amit Bagade, Cumming, GA (US); Nagesh Tavarageri, Cerritos, CA (US); Simin Mofidi, Newport Coast, CA (US)

(73) Assignee: Honda Motor Co., Ltd., Tokyo (JP)

( * ) Notice: Subject to any disclaimer, the term of this patent is extended or adjusted under 35 U.S.C. 154(b) by 380 days.

(21) Appl. No.: 12/143,620

(22) Filed: Jun. 20, 2008

(65) Prior Publication Data
US 2009/0254398 A1    Oct. 8, 2009

Related U.S. Application Data

(63) Continuation of application No. 11/929,395, filed on Oct. 30, 2007, now abandoned.

(51) Int. Cl.
G06Q 30/00 (2006.01)
G06Q 10/00 (2006.01)
G06G 1/14 (2006.01)
G06F 17/00 (2006.01)

(52) U.S. Cl. .......... 705/330; 705/1.1; 705/22; 705/26.2; 705/400

(58) Field of Classification Search .................. 705/1.1, 705/22, 26.2, 330, 400
See application file for complete search history.

(56) References Cited

U.S. PATENT DOCUMENTS
6,029,140 A    2/2000    Martin et al.
(Continued)

FOREIGN PATENT DOCUMENTS
JP    08-096033    4/1996
(Continued)

Primary Examiner — Fadey Jabr
(74) Attorney, Agent, or Firm — McDermott Will & Emery LLP

(57) ABSTRACT

A computer system may manage orders for goods from a plurality of purchasers. The computer system may receive the orders, calculate an approximate volume that the goods which are the subject of each order would collectively occupy during shipment, and compare each calculated approximate volume to a pre-determine maximum allowed volume that the purchaser of the order is permitted. The computer system may accept each order whose approximate volume does not exceed the maximum allowed volume for the purchaser of the order, or reject each order whose approximate volume exceeds this maximum allowed volume.

29 Claims, 4 Drawing Sheets

U.S. PATENT DOCUMENTS

| | | |
|---|---|---|
| 6,219,653 B1* | 4/2001 | O'Neill et al. ............... 705/400 |
| 6,738,750 B2* | 5/2004 | Stone et al. ................. 705/5 |
| 6,931,382 B2* | 8/2005 | Laage et al. ................ 705/67 |
| 7,136,830 B1* | 11/2006 | Kuelbs et al. ............... 705/26.2 |
| 7,260,550 B1* | 8/2007 | Notani ....................... 705/7.31 |
| 7,698,231 B2* | 4/2010 | Clinesmith et al. ......... 705/80 |
| 7,711,602 B2* | 5/2010 | Kroswek et al. ............ 705/22 |
| 7,747,517 B2* | 6/2010 | Sugano et al. .............. 705/38 |
| 2002/0103730 A1* | 8/2002 | Perley et al. ................. 705/30 |
| 2003/0023507 A1* | 1/2003 | Jankelewitz .................. 705/26 |
| 2005/0182635 A1* | 8/2005 | Maikuma et al. ............ 705/1 |
| 2006/0074778 A1* | 4/2006 | Katou et al. .................. 705/28 |
| 2007/0124229 A1* | 5/2007 | Ku et al. ...................... 705/37 |
| 2007/0168261 A1* | 7/2007 | Hull et al. .................... 705/26 |
| 2008/0066176 A1* | 3/2008 | Hamid .......................... 726/21 |
| 2008/0154659 A1* | 6/2008 | Bettes et al. ................. 705/7 |
| 2009/0048987 A1* | 2/2009 | Sweeney et al. ............. 705/400 |
| 2009/0299841 A1* | 12/2009 | Bishop et al. ................ 705/14.21 |
| 2010/0070393 A1* | 3/2010 | Wells et al. .................. 705/30 |
| 2011/0288993 A1* | 11/2011 | Bonalle et al. ............... 705/41 |

FOREIGN PATENT DOCUMENTS

JP    2005-148830    9/2005

\* cited by examiner

COMPUTER SYSTEM FOR MANAGING ORDERS FOR AND DELIVERIES OF GOODS

CROSS-REFERENCE TO RELATED APPLICATION(S)

This application is a continuation of U.S. patent application Ser. No. 11/929,395, entitled "Computer System for Managing Orders for and Deliveries of Goods," filed Oct. 30, 2007, now abandoned, the entire content of which is incorporated herein by reference.

BACKGROUND

1. Field

This disclosure relates to computer systems for managing orders for and deliveries of goods.

2. Description of Related Art

Automobile dealers often place stock orders once a week for automobile parts that they currently need and parts that they will need within a week. The ordered parts are often delivered once a week to the dealers for placement in the dealer's inventory.

This practice can require a considerable amount of parts to be stored by the dealers and a great deal of space for receiving the parts. To accommodate daily service needs, dealers may also need to place urgent orders between their weekly stock orders. These urgent orders may require multiple deliveries each day to dealers via couriers, raising delivery cost.

Orders from several dealers that are on the same shipment route may also exceed the carrying capacity of the delivery vehicle that travels this route. This can prevent all of the orders from promptly being delivered, can cause dealer dissatisfaction, and can create costly confusion at the shipping platform by assemblies of goods that are too large to fit within their targeted delivery vehicles.

U.S. Pat. No. 6,029,140 describes a computer system programmed to set and report product delivery dates. The system maintains customer preferences database having delivery and reporting preferences for individual customers. The preferences include preferred early and late delivery limits.

Japanese patent application publication No. 2005-148830 describes an ordering system for goods that is designed to meet dynamically changing market demands. The system calculates amounts of goods to be ordered according to dynamically changing market demands.

Japanese patent application publication No. Hei 8-96033 describes a system for determining an amount of automobile parts to be ordered for automobiles to be assembled. The system determines the amount of parts to be ordered in accordance with the production plan of the automobiles.

Thus, there is a need for a system for managing the ordering and delivery of goods that permits the retailers and the supplier to carry less inventory, reduces the need for emergency orders, and eliminates packing orders that are too large to fit in their targeted delivery vehicles.

SUMMARY

A computer system may manage orders for goods from a plurality of purchasers. The computer system may receive the orders, calculate an approximate volume that the goods which are the subject of each order would collectively occupy during shipment, and compare each calculated approximate volume to a pre-determine maximum allowed volume that the purchaser of the order is permitted.

The computer system may accept each order whose approximate volume does not exceed the maximum allowed volume for the purchaser of the order.

The computer system may reject each order whose approximate volume exceeds the maximum allowed volume for the purchaser of the order.

The computer system may remove enough goods from each rejected order so as to cause the goods which are the subject of the remaining order to collectively occupy an approximate volume during shipment which does not exceed the maximum allowed volume for the purchaser of the order.

The computer system may schedule the goods removed from each order to be delivered separately from the goods remaining in the order.

The goods may be automobile parts, the purchasers may be automobile dealers, and the orders may be to an automobile parts center.

The computer system may schedule the automobile parts to be delivered to the dealer on the business day following the day each order is received if and only if the order is received by a pre-determined time of the day.

The pre-determined maximum allowed volume that each purchaser is permitted may be based on prior purchases made by the purchaser. The prior purchases by the purchasers may all have taken place over the same period of time.

The pre-determined maximum allowed volume that each purchaser is permitted may be based on the total volume of goods that a delivery vehicle can hold.

The total of the pre-determined maximum allowed volumes for purchasers on the same delivery route may be approximately equal to the total volume of goods that can be held by a delivery vehicle that travels that delivery route.

At least some of the goods may be packaged. The approximate volume of goods that is calculated for such goods may be the approximate volume that the goods occupy in their packaging.

At least some of the goods may be packaged in boxes. The approximate volume of goods that is calculated for such goods may be the approximate volume of the boxes in which the goods are packaged.

A computer system may manage the delivery of goods by a delivery vehicle to a plurality of purchasers over a single delivery route. The computer system may store a pre-determined maximum allowed volume of goods that each purchaser is permitted to order for delivery during a single delivery over the delivery route. The pre-determined maximum allowed volume of goods for all of the purchasers may be approximately equal to the total volume of goods that the delivery vehicle can hold.

An automobile distribution center may include a computer system for managing delivery of automobile parts by delivery vehicles to a plurality of automobile dealers over a plurality of delivery routes. The computer system may store a pre-determined maximum allowed volume of goods that each automobile dealer is permitted to order. The pre-determined maximum allowed volume of goods for all of the automobile dealers on each route may be based on the total volume of goods that the delivery vehicle for that route can hold. The distribution center may include a warehouse configured to warehouse the automobile parts, a plurality of crates in which ordered automobile parts may be packed, and one or more platforms for receiving and delivering packed crates into trucks. The platforms may be divided into a plurality of lanes. Each lane may be dedicated to receiving parts ordered by only one of the automobile dealers.

A computer system may manage orders for goods that are to be delivered to recipients by delivery vehicles. Each delivery vehicle may have a delivery capacity and be scheduled to travel a delivery route to one or more of the recipients. The computer system may store information indicative of a maximum allowed volume of goods that may be delivered to each recipient during a single delivery. The maximum allowed volumes for all of the recipients on each route may total no more than the delivery capacity for the vehicle making the delivery on that route. The computer system may receive each of the orders, compute the approximate volume of the goods that are requested in each order to be delivered to a recipient during a single delivery, and compare each computed volume of goods to the maximum allowed volume of goods that may be delivered to the recipient of the ordered goods during the single delivery.

The maximum allowed volumes for all of the recipients on each route may approximately total the delivery capacity for the vehicle making the delivery on that route.

The computer system may cause each order who's computed volume of goods exceeds the maximum allowed volume of goods to be adjusted such that volume of goods that are ordered therein to be delivered to the recipient during the single delivery does not exceed the maximum allowed volume.

Computer-readable media may contain computer instructions which, when run in a computer system, may cause the computer system to perform one or more of the functions described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
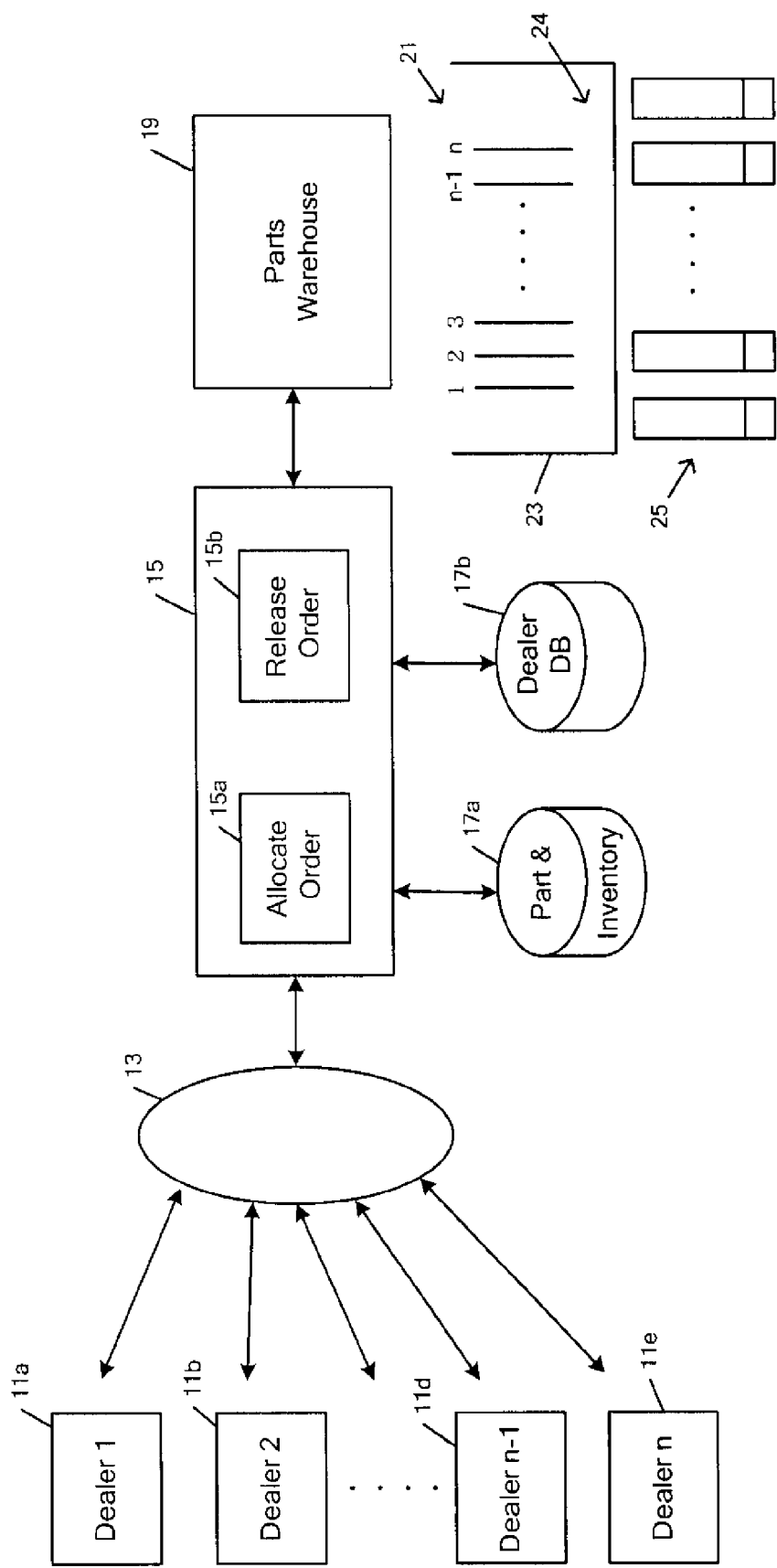
FIG. 1 illustrates a computer system for managing orders of goods and deliveries of those goods.

FIG. 1 illustrates a computer system for managing orders for goods and delivers of those goods. The orders may come from any type or types of purchasers, such as retailers. The retailers may be automobile dealers. The goods may any type of goods, such as automobile parts. The orders may fulfilled by any type of goods supplier, such as a distribution center. The distribution center may be a parts center of an automobile company.

Dealers 1, 2, . . . n may be provided with computers $11a$, $11b$, . . . $11n$ for communication with a host computer 15 via a communication network 13, which may be the Internet. Alternatively, communication between a dealer and the host computer 15 may be established by a point-to-point connection utilizing a dedicated communication channel. Other types of communication systems or channels may be used in addition or instead, including telephones, faxes, and/or emails.

The host computer 15 may include various hardware and software that is configured to perform the various tasks of the host computer 15 described herein, as well as others. The hardware may include one or more processing systems, interfaces, input-output devices, storage devices, databases, communication systems, and/or any other type of components. The hardware may all be at a single location or at multiple locations. The hardware may be at the location of the company fulfilling the order or elsewhere. The software may include one or more application programs, databases, and database manager programs, and may be configured to generate and manage one or more user interfaces through which information is communicated between the host computer 15 and users of the system, such as the information described below.

The dealer computers $11a$, $11b$, . . . $11n$ may be any type of computer or computer system, such as a personal computer or a network of computers. Each dealer computer may include various hardware and software that is configured to perform the various tasks of the dealer computer that are described herein, as well as others. The hardware may include one or more processing systems, interfaces, input-output devices, storage devices, communication systems, databases, and/or any other type of components. The hardware may all be at a single location or at multiple locations. The hardware may be at the location of the dealer or elsewhere. The software may include one or more Internet browsers through which communication with the host computer 15 may be effectuated. In addition or instead, the software may include one or more application programs, databases, and database manager programs, and may be configured to generate and manage one or more user interfaces through which information is communicated between the user and the dealer computer, such as the information described below.

Figure 2:
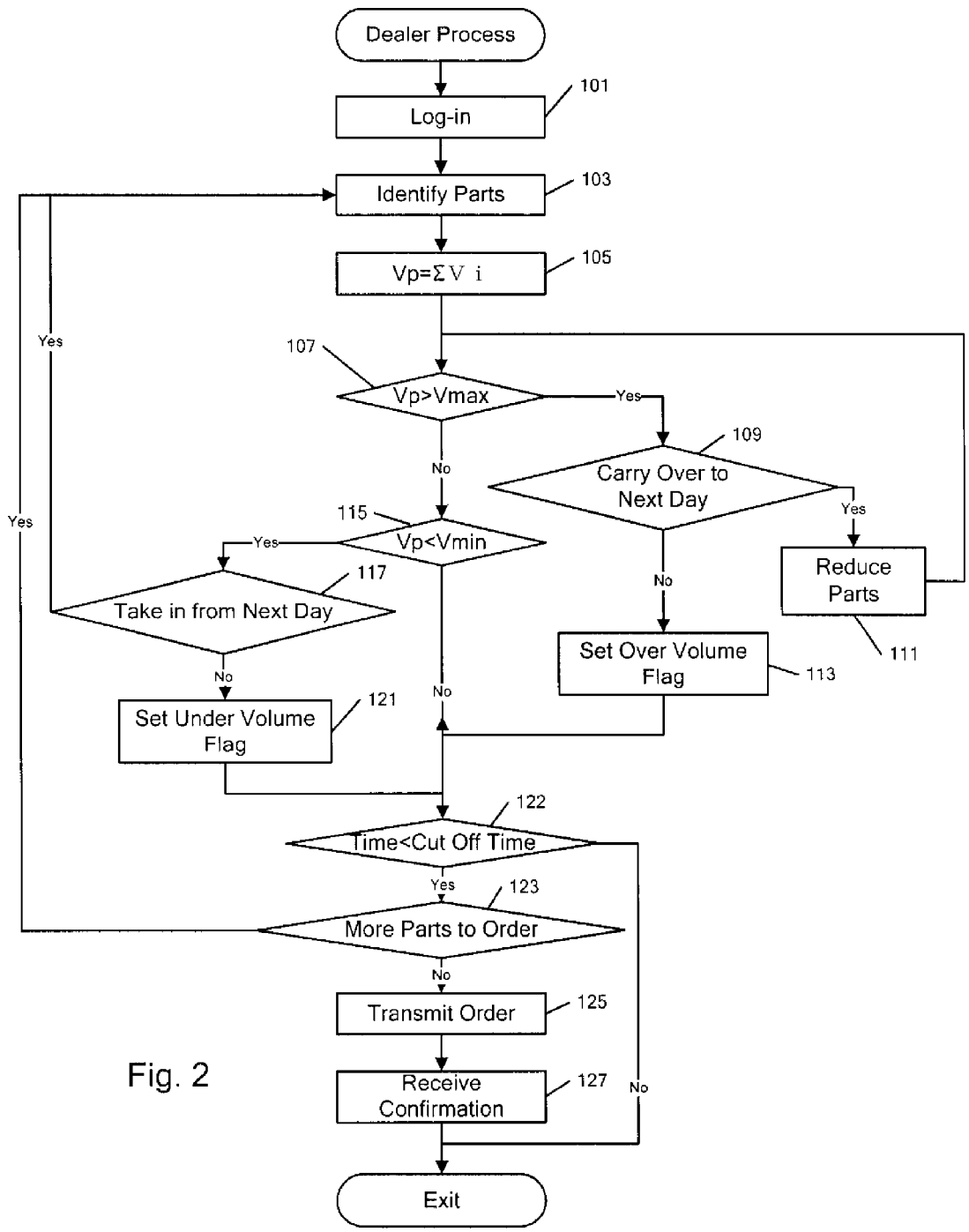
FIG. 2 is a flowchart of a process for entering orders for goods.

Referring to FIG. 2, a dealer may connect to the Internet and may log into the host computer 15 (101). The dealer may identify parts to be ordered for delivery the next day (103). The dealer may do so by selecting these parts from a table of parts stored in a parts and inventory database $17a$. The dealer may in addition or instead select the parts from a table of parts stored in locally at the dealer's computer. The dealer may also or instead directly enter an identification of such parts into the dealer's computer. Orders may also or instead be entered into the host computer 15 by clerks who receive orders from dealers over the phone, in the mail, by faxes, by email, or otherwise.

The parts and inventory database $17a$ may specify the volume that each part would occupy during shipment. "Volume" refers to an amount of three-dimensional space.

The volume may be specified in any form. For example, volume may be specified by a number representing a cubic measurement, such as cubic feet or cubic meters. Volume may in addition or instead be specified by a set of measurements, such as length, width and height. Volume may in addition or instead be specified by any other type of measurements for any other type of shape, such as by a radius for a sphere. The volume specification may include information about the type of shape as well as its measurements. Any other type of information indicative of volume may be used in addition or instead.

The specified volume of each part may represent the volume occupied by the part alone, by the part when in packaging such as a box, and/or by the part when stacked with other similar parts.

The word "volume" in this application is intended to cover all of these variations.

Every time one or more parts are selected and entered (103), the host computer 15 may calculate the sum $V_p$ of the volume of the parts that have thus far been entered (105) based on the volume included in the table of parts.

One or more dealers may be assigned a maximum volume $V_{max}$ of parts for an order to be delivered in a single shipment, such as an order to be delivered during the next day. Similarly, one or more dealers may be assigned a minimum volume $V_{min}$ for an order to be delivered during the next day.

The maximum volume $V_{max}$ may be based on any one or more of a variety of factors. For example, the maximum volume $V_{max}$ may be based on the carrying capacity of the vehicle, such as a truck, that is to deliver the goods to the purchaser. In many cases, the same delivery vehicle will be used to transport the goods to several purchasers over a defined route. In this case, the maximum volume $V_{max}$ for each of the purchasers on the same route may be selected so as not to collectively exceed the carrying capacity of the delivery vehicle. In some cases, the sum of the maximum volume $V_{max}$ for each of these purchases may be selected to approximately equal the carrying capacity of the delivery vehicle, but not to exceed it.

In some cases, the maximum volume $V_{max}$ for each purchaser may be selected to allow for space that may be wasted when combining parts and/or packages of different sizes in the delivery vehicle. In other words, the maximum volume $V_{max}$ for one or more the purchasers may be selected such that the total of these for all of the purchasers on the route of the delivery vehicle will be somewhat less than its carrying capacity. The phrase "approximately equal" or words of similar meaning are intended to cover values that allow for this wasted space.

The minimum volume $V_{min}$ that is assigned to each purchaser may similarly be based on one or more of a variety of considerations. For example, the minimum volume $V_{min}$ may be based on the fixed costs of fulfilling each order, so as to insure that a profit is realized. Other factors, such as the business relationship with the purchaser, and/or its yearly volume of business, may also or instead be considered.

If the sum $V_p$ is less than $V_{max}$ (107) and is not less than $V_{min}$ (115), the process may move to a step 122 where a check may be made to determine if the order has been placed by the cut-off time. The cut-off time may be a deadline for communicating the order to the parts center for next day delivery. If the deadline has not passed, the user of the computer may be prompted to confirm if there are more parts to order (123). If there are more parts to be ordered, the process may go back to step 103.

If there are no more parts to be ordered (123), the order may be transmitted to the host computer 15 by the user clicking a transmit button appearing on a screen of the personal computer (125). The host computer 15 may return a confirmation or may delay this confirmation until after it has gone through the process described later in connection with FIG. 3. The dealer may receive the confirmation (127) and thus be told that the ordering process is complete.

If, during step 107, $V_p$ exceeds $V_{max}$, the order may be trimmed to bring it within the dealer's volume limit. The parts that are trimmed from the order may either be removed permanently or scheduled for delivery on a different day, such as two days after the order is placed. The computer may prompt the user to decide whether to select the parts to remove or to have the computer make the selection (109). If the user chooses to select the parts to be removed, the user may do so (111). If the user chooses to transmit the order as is, an over volume flag may be set to "1" (113), and the order may be transmitted to the host computer with this flag.

If, during step 115, $V_p$ is less than $V_{min}$, the user may be prompted to decide whether to add parts (117). If the user decides to do so, the process may go back to step 103 to allow the user to enter additional parts. If, during the step 117, the user decides to transmit the order as is, an under volume flag may be set to "1" and the order may be transmitted to the host computer 15 with this flag.

$V_{max}$ and $V_{min}$ may be designed to level daily orders, so as to level daily delivery such that the same truck of the same capacity may deliver over the same route to the same dealers every day.

The host computer 15 may include an allocate order module 15a that may be configured to check the inventory of parts to insure that the order can be fulfilled, as well as to insure that the order meets other requirements, The host computer 15 may include an release order module 15b that may be configured to insure that the order meets the maximum and minimum volume restrictions, has been placed by the cut-off deadline, and/or to communicate orders to the warehouse.

Figure 3:
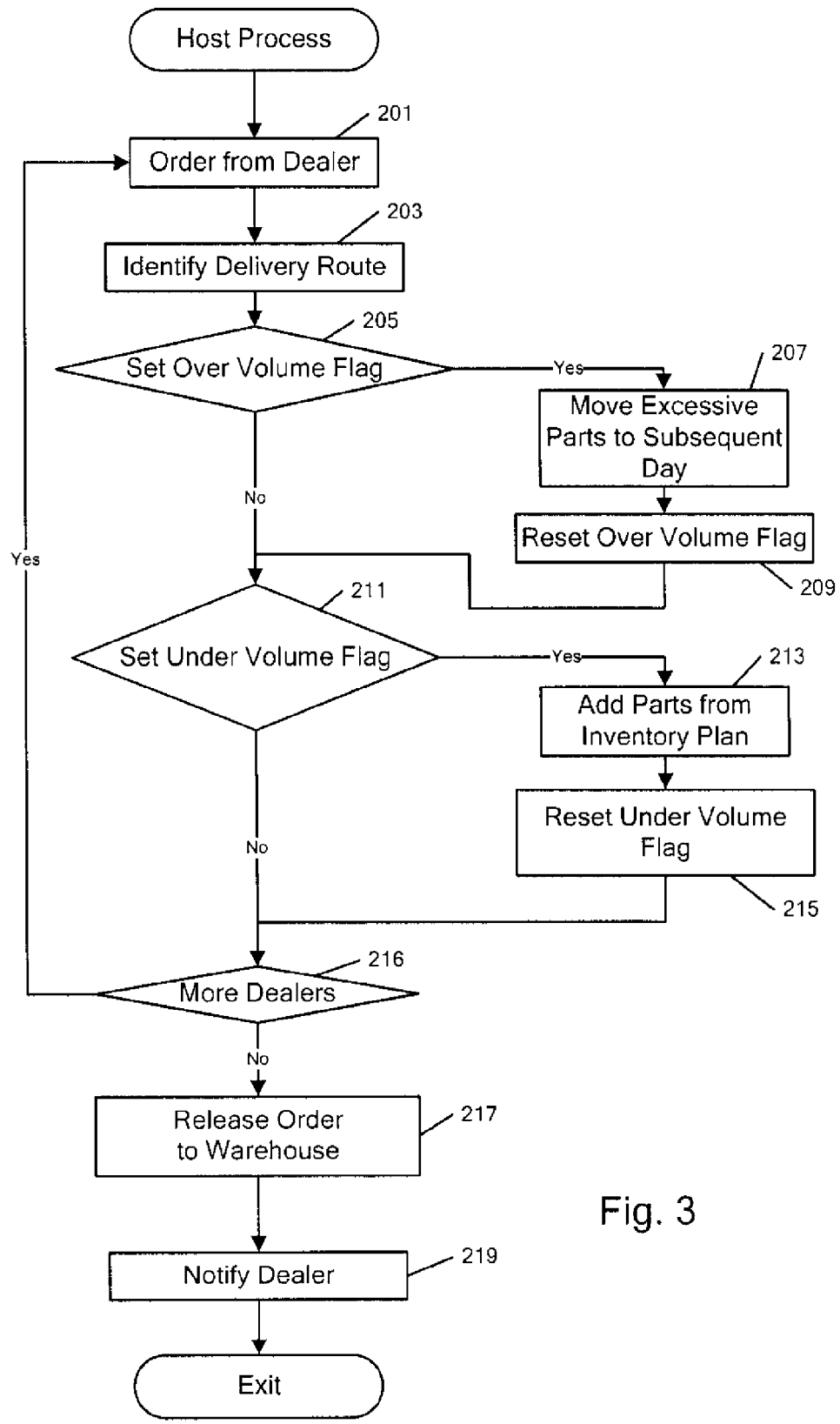
FIG. 3 is a flowchart of a process for processing entered orders for goods.

Referring now to FIG. 3, after an order is received from a dealer (201), a delivery route for the current dealer may be identified (203) by referring to a dealer database 17b. If the order carries an over volume flag (205), the computer may adjust the ordered parts such that the volume of the daily order fits below $V_{max}$. The removed parts may be rescheduled for later delivery (207). This adjustment may cause a notice to be sent to the dealer (219). The over volume flag may be reset (209) and the process may go to step 211.

If the order carries an under volume flag (211), parts may be added from a long term stock order, such as a weekly order (213), until the total volume of the order exceeds $V_{min}$. The under volume flag may be rest (2151) and the process may go to step 216. During step 216, if there are more dealer orders to be processed, the process may go back to the step 201. In this manner, orders from the dealers may be adjusted.

During step 217, packing instructions may be prepared for each route so that parts for the dealers on the same route are packed into the same delivery truck. The packing instructions may be transmitted to mobile terminals of responsible packing staff. Thus, the orders may be released to the parts warehouse 19 (FIG. 1) where parts may be fetched from storage shelves and packed into container crates (cages) that may have wheels.

Different sizes of crates and different sizes of trucks may be used. Large crates and/or large trucks may be used for large trucks. Smaller crates and/or smaller trucks may be used for smaller orders. Empty crates may be returned to the parts center by return trucks. For this purpose, the crates may be foldable.

Small parts may be placed in boxes and packed into the container crates. Several parts may be placed in one box. The volume of the box may be used as the volume of the small parts in calculating the total volume of parts. Empty boxes may be returned to the parts center as well. The boxes may similarly be foldable.

Confirmation of the receipt of the orders may be sent to the dealers (219). Any modification made to the order by the parts center may be included in the confirmation.

Referring again to FIG. 1, a daily delivery scheme will be described. A parts warehouse 19 may be provided with shelves for storing automobile parts. On one side of the warehouse 19, a loading dock 23 may include one or more loading platforms 24 for loading goods into one or more trucks 25. Each loading platform may have access to one or more lines 21, such as to lines 1, 2, 3, . . . n−2, n−1, and n.

Each line may be dedicated to holding the goods ordered by one of the dealers. Thus, for example, line 1 may be dedicated to holding the goods ordered by dealer 1, line 2 may be dedicated to holding the goods ordered by dealer 2, and line 3 to may be dedicated to holding the goods ordered by dealer 3. Ordered parts may be fetched from the warehouse and placed in the lines matching the dealers to whom they are to be delivered and then loaded into the delivery vehicles, such as into the trucks 25.

For example, assume that dealers with dealer codes of 206552, 208287, and 240002 are on the same Route #2. The truck on Route #2 visits dealer 240002 first, dealer 208287 next, and lastly dealer 206552. Line 3 may be assigned to dealer 206552, line 10 may be assigned to dealer 208287, and line may be is assigned to dealer 240002. Dealers that are assigned to the same route may instead be assigned contiguous lines.

Figure 4:
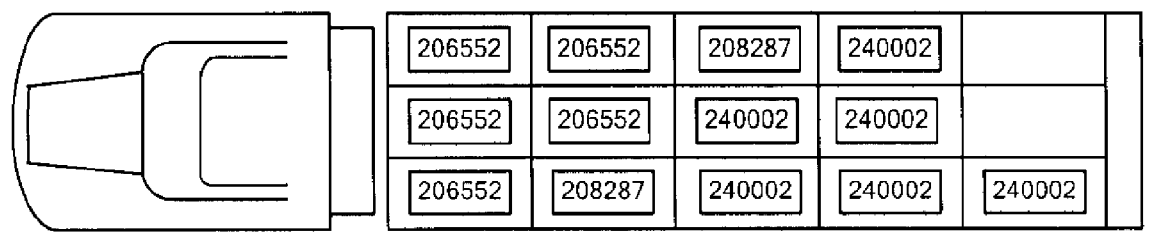
FIG. 4 is a plane view of a delivery truck carrying parts crates (cages) for three different dealers.

The instruction from the host computer 15 or the parts center to packing personnel in the warehouse 19 may be to pack the container crates in line 3, line 10, and line 15 into the truck that delivers along Route #2 so that crates for dealer 240002 may be carried out at the first stop without interference with the crates for the other dealers. Likewise, the crates for dealer 208287 may be arranged in the truck to be carried out at the second stop without interference with the crates for the last dealer. FIG. 4 illustrates a plane view of the truck for Route #2 packed with crates for the three dealers as described above.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, a broad variety of information may be stored in the parts and inventor database 17a and the dealer database 17b. For example, the parts and inventory database 17a may include a description of each part, a part number for each part, its price, its volume by itself, its volume when stacked with other identical or similar parts, the volume of its packaging, such as a box, whether the part is to be placed in a tote prior to shipment, what size tote should be used, and/or where the part may be located in inventory. Similarly, the dealer database 17b may include a dealer number, the dealer name, the dealer route number, the type of cages used by the dealer, and/or the maximum and minimum allowable order volumes in one or more of the formats described above. Details about each order may also be stored in the dealer database 17b, including whether any flags have been set to signify an order that exceeds the maximum volume or misses the minimum volume.

A routing database may also be provided for use by the host computer 15 and/or the dealer computers 11a, 11b, . . . 11d, 11e. The routing database may include a route number, a route name, other information relating to the route, a truck number, the carrier used, the types of cages that are appropriate for the truck, the number of cages that the truck may hold, the delivery volume of the truck, and/or the number of the dealers on the route. The routing database may include information about each order, including the order number, the party placing the order, and/or the expected arrival time.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A computer system for managing orders for goods from a plurality of purchasers, the computer system comprising hardware, including a processing system and an input and output device, and software, including an application program which when run in the computer system causes the computer system to:
    receive the orders;
    calculate an approximate cubic volume that the goods which are the subject of each order would collectively occupy during shipment;
    compare each calculated approximate cubic volume to a pre-determined maximum allowed cubic volume that the purchaser of the order is permitted; and
    release orders consistent with this comparison.

2. The computer system of claim 1 wherein the computer system is further configured to accept each order whose approximate volume does not exceed the maximum allowed volume for the purchaser of the order.

3. The computer system of claim 1 wherein the computer system is further configured to reject each order whose approximate volume exceeds the maximum allowed volume for the purchaser of the order.

4. The computer system of claim 3 wherein the computer system is further configured to remove enough goods from each rejected order so as to cause the goods which remain after the removal to collectively occupy an approximate volume during shipment which does not exceed the maximum allowed volume for the purchaser of the order.

5. The computer system of claim 4 wherein the computer system is further configured to schedule the goods removed from each order for delivery separate from the goods remaining in the order.

6. The computer system of claim 4 wherein the pre-determined maximum allowed volume that each purchaser is permitted is based on prior purchases made by the purchaser.

7. The computer system of claim 1, wherein the goods are automobile parts, the purchasers are automobile dealers, and the orders are to automobile parts center.

8. The computer system of claim 7 wherein the computer system is configured to schedule the automobile parts to be delivered to the dealer on the business day following the day each order is received if and only if the order is received by a pre-determined time of the day.

9. The computer system of claim 1 wherein the pre-determined maximum allowed volume that each purchaser is permitted is based on prior purchases made by the purchaser.

10. The computer system of claim 8 wherein the pre-determined maximum allowed volume that each purchaser is permitted is also based on the total volume of goods that a delivery vehicle can hold.

11. The computer system of claim 1 wherein the total of the pre-determined maximum allowed volumes for purchasers on the same delivery route is approximately equal to the total volume of goods that can be held by a delivery vehicle that travels that delivery route.

12. The computer system of claim 1 wherein at least some of the goods are packaged in boxes and wherein the approximate volume of goods that is calculated for such goods is the approximate volume of the boxes in which the goods are packaged.

13. A computer system for managing the delivery of goods by a delivery vehicle to a plurality of purchasers over a single delivery route, the computer system comprising hardware, including a processing system and an input and output device, and software, including an application program which when run in the computer system causes the computer system to store a pre-determined maximum allowed cubic volume of goods that each purchaser is permitted to order for delivery during a single delivery over the delivery route, the pre-determined maximum allowed cubic volume of goods for all of the purchasers being approximately equal to the total cubic volume of goods that the delivery vehicle can hold, and release orders consistent with these maximums.

14. The computer system of claim 13, wherein the goods are automobile parts, the purchasers are automobile dealers, and the orders are to an automobile parts center.

15. The computer system of claim 13 wherein the pre-determined maximum allowed volume that each purchaser is permitted is based on prior purchases that the purchaser has made.

16. The computer system of claim 15 wherein the prior purchases by the purchasers all took place over the same period of time.

17. The computer system of claim 15 wherein the computer system is further configured to receive orders, reject each order whose approximate volume exceeds the maximum allowed volume for the purchaser of the order, and remove enough goods from each order that exceeds its pre-determined maximum allowed volume so as to cause the goods which remain after the removal to collectively occupy an approximate volume during shipment which does not exceed the maximum allowed volume for the purchaser of the order.

18. An automobile distribution center comprising: a computer system for managing delivery of automobile parts by delivery vehicles to a plurality of automobile dealers over a plurality of delivery routes, the computer system being configured to store a pre-determined maximum allowed cubic volume of goods that each automobile dealer is permitted to order, the pre-determined maximum allowed cubic volume of goods for all of the automobile dealers on each route being based on the total cubic volume of goods that the delivery vehicle for that route can hold, and release orders consistent with this information; a warehouse configured to warehouse the automobile parts; a plurality of crates in which ordered automobile parts may be packed; and one or more platforms for receiving and delivering packed crates into trucks, the platforms being divided into a plurality of lanes, each lane being dedicated to receiving parts ordered by only one of the automobile dealers.

19. The automobile distribution center of claim 18 wherein:
the computer system is further configured to receive each order from one of the dealers, reject each order whose approximate volume exceeds the maximum allowed volume for the dealer of the order, and remove enough goods from each order that exceeds its pre-determined maximum allowed volume so as to cause the goods which remain after the removal to collectively occupy an approximate volume during shipment which does not exceed the maximum allowed volume for the dealer of the order; and
the pre-determined maximum allowed volume that each dealer is permitted is based on prior purchases made by the dealer.

20. A computer system for managing orders for goods that are to be delivered to recipients by delivery vehicles, each delivery vehicle having a delivery capacity and being scheduled to travel a delivery route to one or more of the recipients, the computer system comprising hardware, including a processing system and an input and output device, and software, including an application program which when run in the computer system causes the computer system to:
store information indicative of a maximum allowed cubic volume of goods that may be delivered to each recipient during a single delivery, the maximum allowed cubic volumes for all of the recipients on each route totaling no more than the delivery capacity for the vehicle making the delivery on that route; receive each of the orders; compute the approximate cubic volume of the goods that are requested in each order to be delivered to a recipient during a single delivery; compare each computed cubic volume of goods to the maximum allowed volume of goods that may be delivered to the recipient of the ordered goods during the single delivery; and release orders consistent with this comparison.

21. The computer system of claim 20 wherein the maximum allowed volumes for all of the recipients on each route approximately total the delivery capacity for the vehicle making the delivery on that route.

22. The computer system of claim 20 wherein the computer system is further configured to cause each order whose computed volume of goods exceeds the maximum allowed volume of goods to be adjusted such that volume of goods that are ordered therein to be delivered to the recipient during the single delivery does not exceed the maximum allowed volume.

23. The computer system of claim 22 wherein the pre-determined maximum allowed volume that each dealer is permitted is based on prior purchases made by the dealer.

24. The computer system of claim 20 wherein the maximum allowed volume of goods that may be delivered to each recipient during a single delivery is based on a volume of previous deliveries to the recipient.

25. The computer system of claim 20 wherein at least some of the goods are packaged and wherein the approximate volume of goods that is calculated for such goods is the approximate volume that the goods occupy in their packaging.

26. The computer system of claim 25 wherein at least some of the goods are packaged in boxes and wherein the approximate volume of goods that is calculated for such goods is the approximate volume of the boxes in which the goods are packaged.

27. The computer system of claim 20 wherein the goods are automobile parts, the recipients are automobile dealers, and the orders are to an automobile parts center.

28. A non-transitory, tangible, computer-readable media containing computer instructions which, when run in a computer system, cause the computer system to manage orders for goods from a plurality of purchasers, including:
   receiving the orders;
   calculating an approximate cubic volume that the goods which are the subject of each order would collectively occupy during shipment;
   comparing each calculated approximate volume to a predetermined maximum allowed cubic volume that the purchaser of the order is permitted; and
   release orders consistent with this comparison.

29. The media of claim 28 wherein the instructions are further configured when run in the computer system to:
   reject each order whose approximate volume exceeds the maximum allowed volume for the purchaser of the order; and
   remove enough goods from each rejected order so as to cause the goods which remain after the removal to collectively occupy an approximate volume during shipment which does not exceed the maximum allowed volume for the purchaser of the order.

* * * * *